(12) United States Patent
Hyer

(10) Patent No.: US 11,754,433 B2
(45) Date of Patent: Sep. 12, 2023

(54) LOAD SENSING SYSTEM WITH STABILIZED FULCRUMS

(71) Applicant: Hyer Industries, Inc., Pembroke, MA (US)

(72) Inventor: Frank S. Hyer, Duxbury, MA (US)

(73) Assignee: Hyer Industries, Inc., Pembroke, MA (US)

( * ) Notice: Subject to any disclaimer, the term of this patent is extended or adjusted under 35 U.S.C. 154(b) by 645 days.

(21) Appl. No.: 17/009,269

(22) Filed: Sep. 1, 2020

(65) Prior Publication Data

US 2021/0072069 A1   Mar. 11, 2021

Related U.S. Application Data

(60) Provisional application No. 62/897,883, filed on Sep. 9, 2019.

(51) Int. Cl.
*G01G 1/24* (2006.01)
*G01G 3/12* (2006.01)

(52) U.S. Cl.
CPC ............... *G01G 1/24* (2013.01); *G01G 3/12* (2013.01)

(58) Field of Classification Search
CPC ........... G01G 1/24; G01G 3/12; G01G 21/244
USPC ...................................................... 177/256
See application file for complete search history.

(56) References Cited

U.S. PATENT DOCUMENTS

| 2,741,472 | A | 4/1956 | Thayer et al. |
| 3,477,533 | A | 11/1969 | Hyer et al. |
| 3,512,595 | A | 5/1970 | Laimins |
| 3,658,143 | A | 4/1972 | Schwartz |
| 4,682,664 | A | 7/1987 | Kemp |
| 6,367,338 | B1 * | 4/2002 | Hess ..................... G01G 21/244 73/862.381 |
| 6,903,282 | B2 | 6/2005 | Hyer |

(Continued)

FOREIGN PATENT DOCUMENTS

| CA | 835229 | A | 2/1970 | |
| CA | 2600422 | * | 9/2006 | ............. G01G 19/44 |

*Primary Examiner* — Jacques M Saint Surin
(74) *Attorney, Agent, or Firm* — Douglas Denninger

(57) ABSTRACT

A load sensing system having at least one load sensing assembly for use with a weigh frame, each assembly including at least a first lever and a second lever. Each lever has a lever longitudinal axis, a lever fulcrum section, a lever load section, and a lever connector section spaced from the lever fulcrum section and the lever load section along the lever longitudinal axis. For each lever, a flexure plate is aligned in parallel with the lever longitudinal axis and has a middle bearing portion and opposing end portions with one of the end portions fixedly attached to its respective lever. Each lever fulcrum section has a lever bearing surface including one of (i) a line-of-contact rounded bearing edge oriented perpendicular to the lever longitudinal axis or (ii) a flat bearing face. The lever bearing surface of each lever touches the middle bearing portion of the flexure plate. Each assembly further includes a sensor having a support surface, a force transmission platform, and an output representative of total force applied to the force transmission platform. At least one force transmission link is adapted to connect each lever connector section to the force transmission platform, and at least one load link is adapted to connect the lever load section of each lever to the weigh frame.

19 Claims, 11 Drawing Sheets

(56) References Cited

U.S. PATENT DOCUMENTS

| | | | | |
|---|---|---|---|---|
| 8,829,366 | B2* | 9/2014 | Yuan | G01G 11/04 177/145 |
| 9,024,212 | B2 | 5/2015 | Hyer et al. | |
| 2017/0284857 | A1* | 10/2017 | Hauck | G01G 7/04 |
| 2020/0355544 | A1* | 11/2020 | Wu | G01G 21/244 |

* cited by examiner

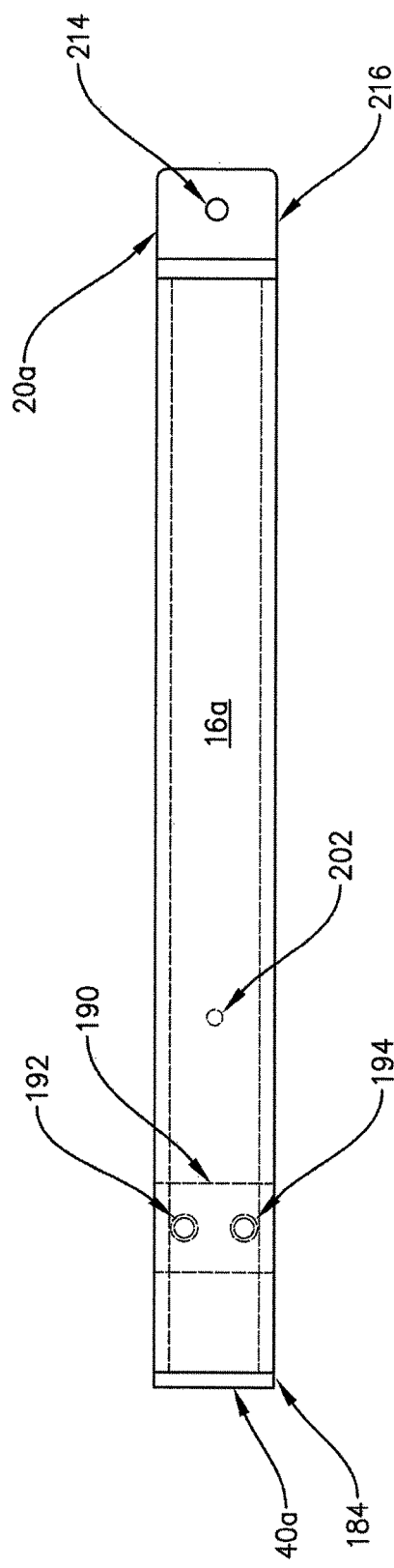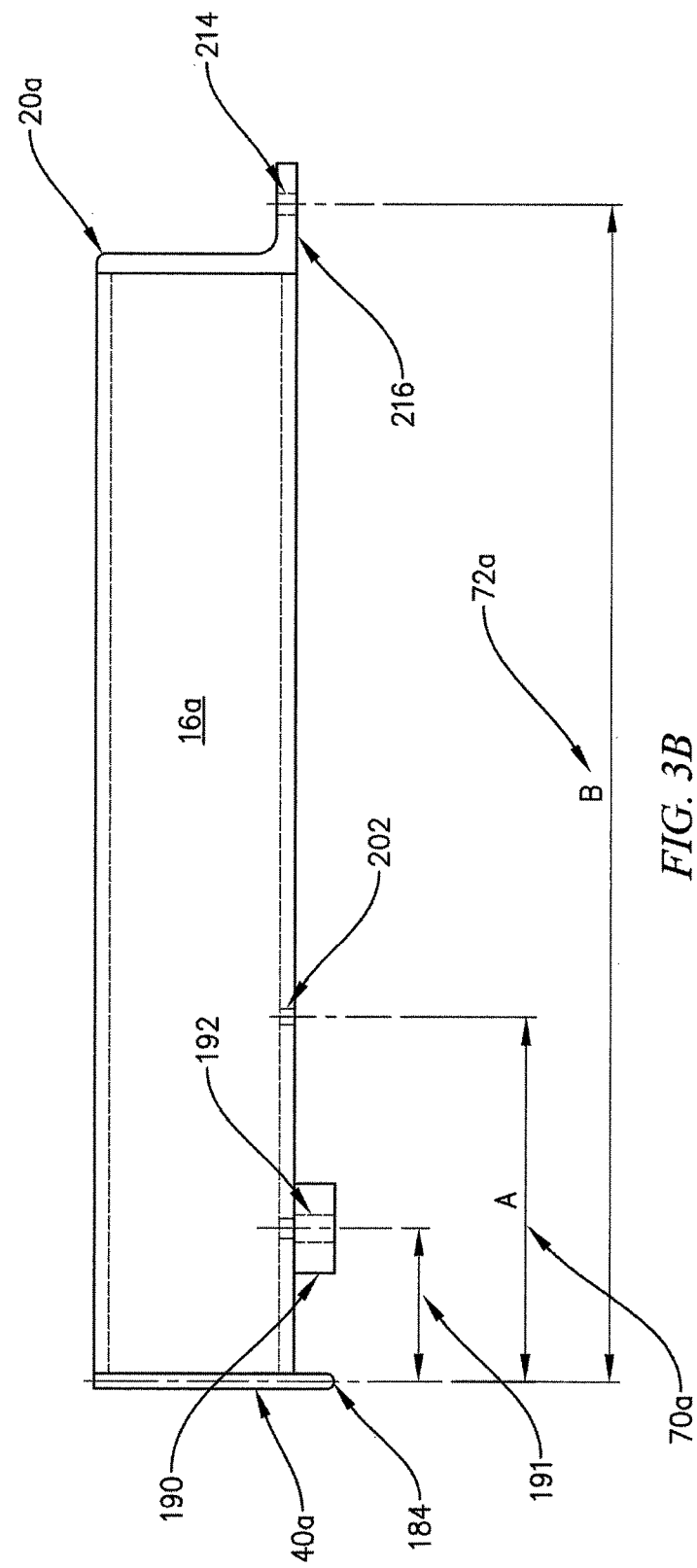
FIG. 3A
FIG. 3B

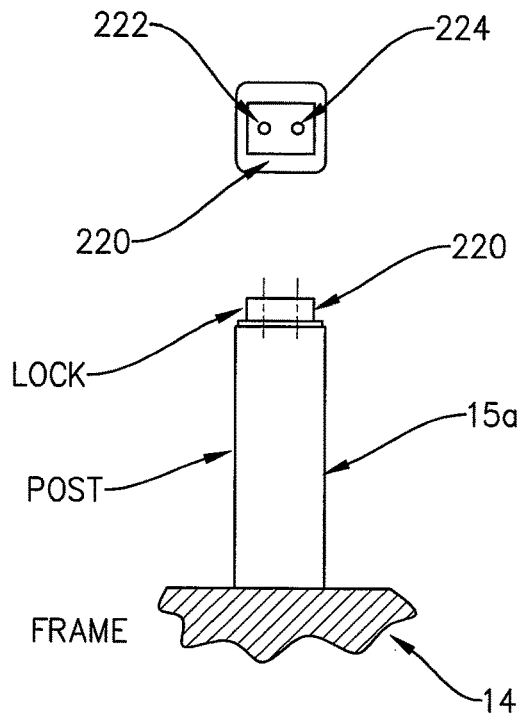
FIG. 4A
FIG. 4B
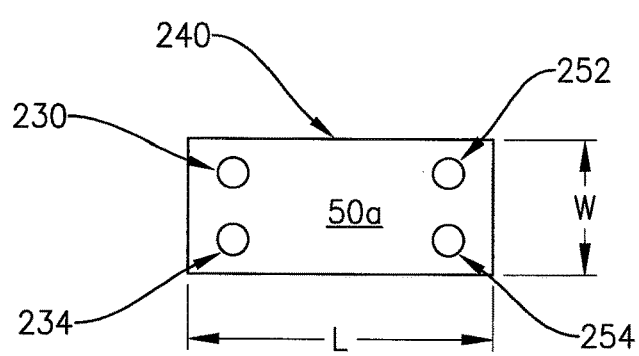
FIG. 5
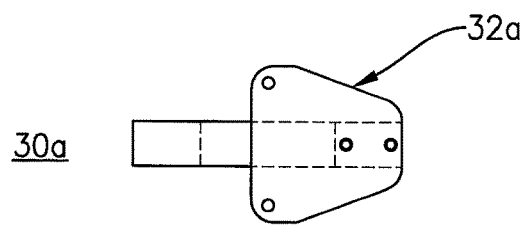
FIG. 6A
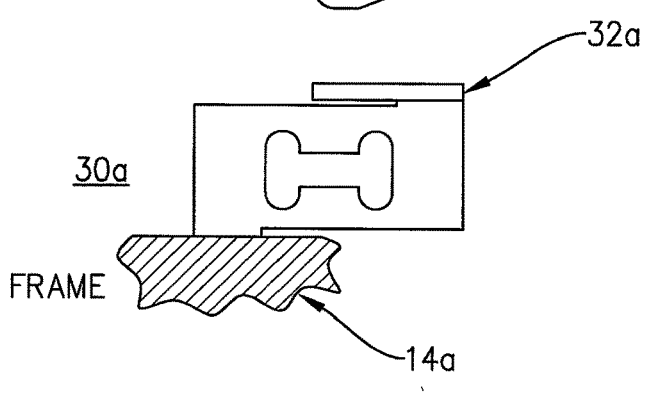
FIG. 6B

LOAD SENSING SYSTEM WITH STABILIZED FULCRUMS

CROSS-REFERENCE TO RELATED APPLICATION

This application claims the benefit of U.S. Provisional Patent Application No. 62/897,883 filed 9 Sep. 2019. The entire contents of the above-mentioned application are incorporated herein by reference.

FIELD OF THE INVENTION

The invention relates to load sensing systems for platform weigh scales.

BACKGROUND OF THE INVENTION

Load sensing assemblies for measuring weight of loads must contend with both vertical and horizontal directional force components. An automatic checking scale with weigh beam and opposing torsion levers suspended by flexure plates is disclosed by Thayer et al. in U.S. Pat. No. 2,741,472. Weighing scales with tension linkages are described by Hyer et al. in U.S. Pat. No. 3,477,533 and by Hyer in U.S. Pat. No. 6,903,282. A flexure plate scale utilizing vertical flexure plates extending from torque transmitting members with levers is presented by Schwartz in U.S. Pat. No. 3,658,143.

Certain cantilevered parallel beam load cells are described by Kemp in U.S. Pat. No. 4,682,664, for example, connected to belt supports such as weigh idlers. These load cells are most commonly referred to in the trade as "Single Point" load cells. Other names include "Parallelogram" load cells, "Platform" load cells, "Cantilevered Dual Parallel Beam" load cells and "Cantilevered Triple Parallel Beam" load cells. Such load cells are available in a wide range of capacities starting as low as one or two kg for low-density loads, and generally exhibit exceptional insensitivity to moments created by "off-center" placement of loads. The parallelogram structure created by at least two cantilevered parallel beams responds to deflection in a manner similar to that of a parallelogram linkage such that the load receiving column moves parallel to the support bearing column, thereby minimizing any tilting of the weigh idler in the direction of the movement of the belt.

Single point load cells when used to support a single, typically planar weigh platform or deck exhibit a high degree of insensitivity to the positioning of a vertical load anywhere upon it. However, if the weigh platform is coupled externally to any other structure which impedes the normal linear and angular deflections that would occur due to the moments generated by off-center loading, the effectiveness of the built-in compensation may be seriously compromised.

Vibratory disturbances may also interfere with accurate weight readings. These disturbances can arise from nearby equipment such as material processing equipment, including vibratory conveyors, bin activators, and/or drum mixers in proximity to the weigh scale.

A suspension-type strain gauge transducer structure for platform scales is disclosed by Laimins in U.S. Pat. No. 3,512,595. Wire-type coupling elements or box-beam members are disposed at one or more locations about the Laimins platform. A sensitive load sensing system with flexure plate is described by Hyer et al. in U.S. Pat. No. 9,024,212 B2. A "stabilized pivot" with flexure plate for weighing scales is disclosed by Hyer et al. in Canadian Patent No. 835,229.

It is therefore desirable to have a load sensing system which is less affected by vibrations and variable loading and placement of loads on weigh frames such as encountered in the food, plastics and chemical industries.

SUMMARY OF THE INVENTION

An object of the present invention is to provide an improved load sensing system with increased accuracy, particularly for variably-placed loads and/or weigh frames subjected to vibrations and/or different force moments when the loads come in contact with the weigh frame.

Another object of the present invention is to provide such a system which "settles" more quickly and can extend the percentage of gravimetric running time, especially for loss-in-weight feeder systems.

This invention results from the realization that a weigh frame suspended from at least two opposing sensing assemblies, each assembly including a load cell placed between a pair of levers with each lever having a longitudinally inextensible force transmission link at its inner end connected to a platform on the load cell and having a laterally-stabilized horizontal fulcrum at its opposite end, can provide loading signals independent of loading location on the weigh frame, including convenient summing of non-axial loads. This invention is especially suitable for loss-in-weight feeder systems and other applications for which it is desirable to minimize or eliminate extraneous moments from being imparted to a tilting platform, particularly when the force transmission links and the load cell platform are not exactly perpendicular, that is, when the links are aligned at other than ninety degrees relative to the platform.

This invention features a load sensing system having at least one load sensing assembly for use with a weigh frame, each assembly including at least a first lever and a second lever. Each lever has a lever longitudinal axis, a lever fulcrum section, a lever load section, and a lever connector section spaced from the lever fulcrum section and the lever load section along the lever longitudinal axis. For each lever, a flexure plate is aligned in parallel with the lever longitudinal axis and has a middle bearing portion and opposing end portions with one of the end portions fixedly attached to its respective lever. Each lever fulcrum section has a lever bearing surface including one of (i) a line-of-contact rounded bearing edge oriented perpendicular to the lever longitudinal axis or (ii) a flat bearing face. The lever bearing surface of each lever touches the middle bearing portion of the flexure plate. Each assembly further includes a sensor having a support surface, a force transmission platform, and an output representative of total force applied to the force transmission platform. At least one force transmission link is adapted to connect each lever connector section to the force transmission platform, and at least one load link is adapted to connect the lever load section of each lever to the weigh frame.

In some embodiments, each force transmission link for each lever connector section includes a relatively inextensible and transversely yieldable tension connector attachable to the force transmission platform, and each load link for each lever load section includes a relatively inextensible and transversely yieldable tension connector attachable to the weigh frame. In a number of embodiments, the tension connectors are universally flexible, as defined below. In certain embodiments, each lever load section is disposed between the lever fulcrum section and the lever connector section. In one embodiment, the sensor includes a single point, multiple parallel beam load cell, and the first lever and the second lever are identical to each other.

In certain embodiments, the system further includes, for each lever fulcrum section of each lever, a support defining a support bearing surface having the other of (i) a line-of-contact rounded bearing edge oriented perpendicular to the lever longitudinal axis or (ii) a flat bearing face, the support bearing surface for each lever touching an opposite side of the middle bearing portion of the flexure plate, and the other of the end portions of the flexure plate for that lever fixedly attached to another portion of the support to enhance lateral stability for that lever.

This invention also features a load sensing system for a platform scale having a weigh frame, the load sensing system having at least two load sensing assemblies, each assembly including at least a first lever and a second lever, each lever having a lever fulcrum section, a lever load section and a lever connector section spaced from the lever fulcrum section and the lever load section. For each lever, a flexure plate is aligned in parallel with the lever longitudinal axis, the flexure plate having a middle bearing portion and opposing end portions with one of the end portions fixedly attached to its respective lever to provide lateral stability for that lever. The system further includes a load cell having a support surface, a force transmission platform, and an output representative of total force applied to the force transmission platform. At least one force transmission link connects each lever connector section to the force transmission platform; and at least one load link connects the lever load section of each lever to the weigh frame. The load sensing assemblies are positioned on opposing sides of the weigh frame.

In some embodiments, the load sensing assemblies are positioned parallel to each other. In certain embodiments, each force transmission link for each lever connector section includes a tension connector attachable to the force transmission platform for its respective load cell, and each load link for each lever load section includes a tension connector attachable to the weigh frame. In one embodiment, each lever load section is disposed between the lever fulcrum section and the lever connector section, and the first lever and the second lever of each assembly are identical to each other. In certain embodiments, each lever fulcrum section has a lever bearing surface including a line-of-contact rounded bearing edge oriented perpendicular to the lever longitudinal axis, the lever bearing surface of each lever touching the middle bearing portion of the flexure plate.

This invention further features a method for measuring loads on a weigh frame utilizing a load sensing system, the method including the steps of selecting a load sensing system having at least two load sensing assemblies. Each assembly includes: (A) at least a first lever and a second lever, each lever having a lever fulcrum section, a lever load section and a lever connector section spaced from the lever fulcrum section and the lever load section; (B) for each lever, a flexure plate aligned in parallel with the lever longitudinal axis, the flexure plate having a middle bearing portion and opposing end portions with one of the end portions fixedly attached to its respective lever to provide lateral stability for that lever; (C) a load cell having a support surface, a force transmission platform, and an output representative of total force applied to the force transmission platform; (D) at least one force transmission link connecting each lever connector section to the force transmission platform; and (E) at least one load link connecting the lever load section of each lever to the weigh frame, wherein the load sensing assemblies are positioned on opposing sides of the weigh frame. The method further includes applying loads onto the weigh frame, and measuring total force applied to each load cell.

In one embodiment, the method also includes selecting each lever fulcrum section to include a lever bearing surface including a line-of-contact rounded bearing edge oriented perpendicular to the lever longitudinal axis, the lever bearing surface of each lever touching the middle bearing portion of the flexure plate. In certain embodiments, a volumetric feeder with a hopper is attached to the weigh frame and applying loads includes automatically refilling the hopper before the hopper becomes empty. In some embodiments, signals from the at least two load cells are summed to obtain a signal proportional to the load on the weigh frame.

This invention may also be expressed as a method for assembling a load sensing system as described herein.

BRIEF DESCRIPTION OF THE DRAWINGS

In what follows, preferred embodiments of the invention are explained in more detail with reference to the drawings, in which:

FIGS. 3A and 3B are schematic bottom and side views, respectively, of a lever of FIG. 2 utilized according to the present invention;

FIGS. 4A and 4B are schematic bottom and side views, respectively, illustrating one embodiment of a support stanchion of a base frame as utilized by the systems of FIGS. 1 and 2;

FIG. 5 is a top plan view of a flexure plate utilized according to the invention;

FIGS. 6A and 6B are schematic top and side views, respectively, of a load cell utilized according to the present invention by the systems of FIGS. 1 and 2;

DETAILED DESCRIPTION OF THE PRESENTLY PREFERRED EMBODIMENTS

Figure 1:
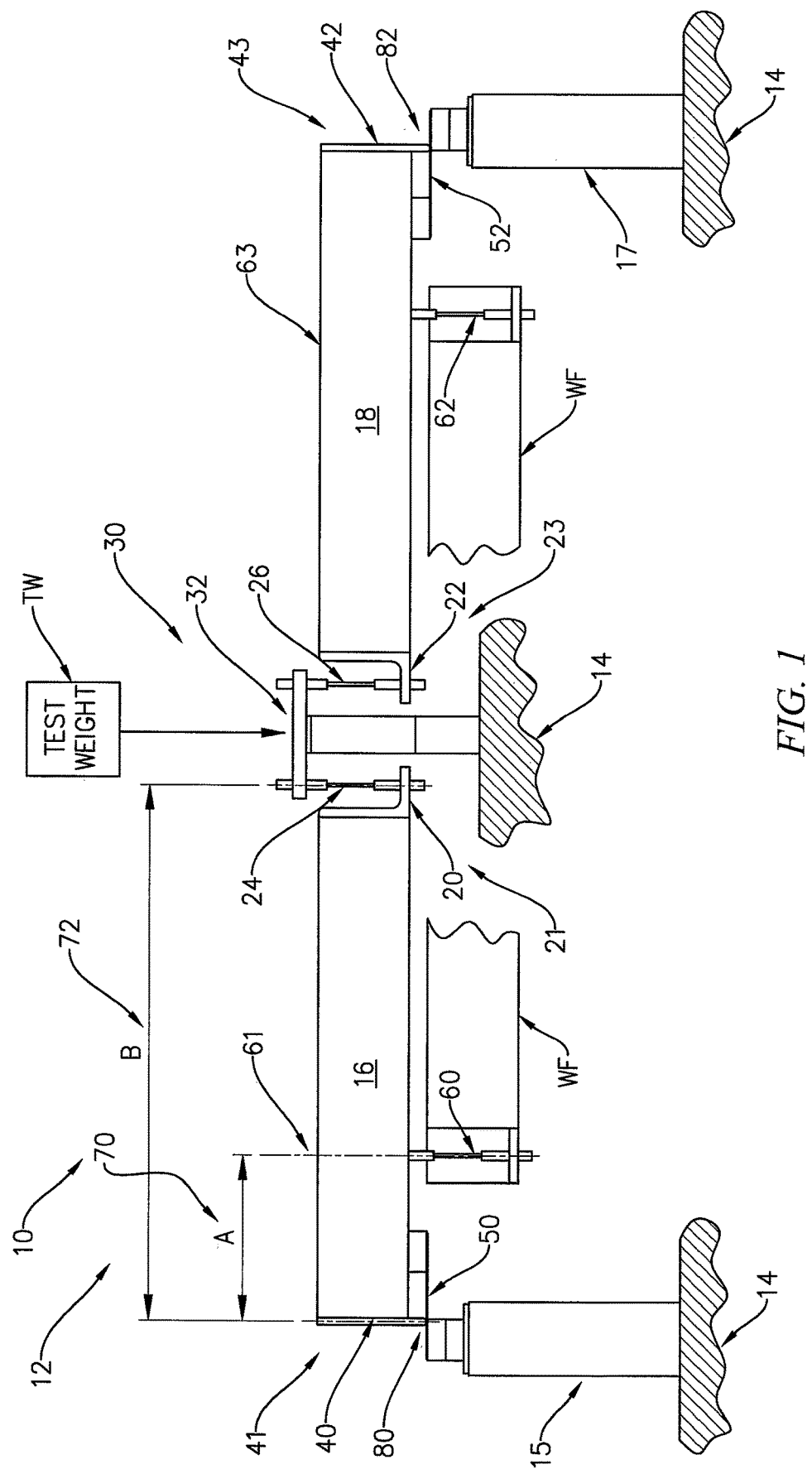
FIG. 1 is a schematic side perspective view of a load sensing system according to the present invention having a load sensing assembly supported by a base frame (indicated in partial cross-section) and connected to a weigh frame by tension links in this embodiment.

This invention may be accomplished by a load sensing system having at least one load sensing assembly for use with a weigh frame, each assembly including at least a first lever and a second lever. Each lever has a lever longitudinal axis, a lever fulcrum section, a lever load section, and a lever connector section spaced from the lever fulcrum section and the lever load section along the lever longitudinal axis. For each lever, a flexure plate is aligned in parallel with the lever longitudinal axis and has a middle bearing portion and opposing end portions with one of the end portions fixedly attached to its respective lever. Each lever fulcrum section has a lever bearing surface including one of (i) a line-of-contact rounded bearing edge oriented perpendicular to the lever longitudinal axis or (ii) a flat bearing face. The lever bearing surface of each lever touches the middle bearing portion of the flexure plate. Each assembly further includes a sensor such as a load cell having a support surface, a force transmission platform, and an output representative of total force applied to the force transmission platform. At least one force transmission link, such as a flexible cable or other tension connector, is adapted to connect each lever connector section to the force transmission platform, and at least one load link is adapted to connect the lever load section of each lever to the weigh frame.

The term "lever" is utilized herein in its ordinary meaning of a rigid body that rotates about a fulcrum as a load on the rigid body increases. Rotation of the lever is about a "theoretical" axis of rotation at the fulcrum that is perpendicular to the longitudinal axis of the lever, and is along a plane of rotation. The effect of the load on the rigid body is measured by a sensor such as a load cell connected to the rigid body.

The term "relatively inextensible" as utilized herein has the same meaning for a component as in U.S. Pat. No. 3,477,533 by Hyer et al., namely that, under maximum tensile strength encountered during use within the design capabilities of the load sensing system, including foreseeable shock and overload, the component will not elongate more than a negligibly small fraction of the total length for that component. One example of such a relatively inextensible tension component is a steel cable formed of wires twisted helically to form a wire rope.

The term "transversely yieldable" as utilized herein refers to bending along at least one plane that contains the length of a component. For example, a flexure plate is transversely yieldable along a single plane. By comparison, a steel cable is "universally flexible", that is, it is transversely yieldable along all planes containing the length of the cable. See "relatively inextensible but universally transversely flexible suspension members" in U.S. Pat. No. 3,477,533 by Hyer et al. See also the "universally transversely flexible and relatively inextensible suspension members" in U.S. Pat. No. 6,903,282 by Hyer. The entire contents of each of U.S. Pat. Nos. 3,477,533 and 6,903,282 are incorporated herein by reference.

In general terms regarding one construction according to the present invention, the fulcrum establishing the axis of lever rotation is the line of contact between (a) the rounded bearing edge extending downward from the back of the horizontal lever and (b) the horizontal flat surface that it bears on. In one construction, the horizontal flat surface is the upper surface of a thin horizontal flexure plate disposed on top of an unyielding (that is, rigid) flat bearing face of a support frame, which may also be considered as a fixed base or "ground". The flexure plate is attached at one end to the lever and, at its opposite end, to the support frame, and is "sandwiched" between (i) a line-of-contact rounded bearing edge oriented perpendicular to the lever longitudinal axis and (ii) a flat bearing face.

The horizontal flexure plate utilized according to the present invention acts as the lateral stabilizer for the lever, that is, the flexure plate resists lateral, sideways movement while enabling rotation along a vertical plane of rotation. By placing the horizontal stabilizing flexure plate in contact with the rounded surface of the fulcrum axis, any tension forces in the flexure plate cannot generate moments in the lever because the moment arm is zero length.

As described in more detail below, one advantage of such flexure plates utilized horizontally according to the present invention is that vibration of the levers is greatly reduced or eliminated by the flexure plates. In other words, the levers secured according to the present invention cannot vibrate laterally in sympathy with vibratory disturbances created by rotating elements in a screw feeder or other feed mechanism, and/or other nearby mechanical disturbances.

Load sensing system 10, FIG. 1, according to one construction of the present invention has a load sensing assembly 12 supported by a base or support frame 14 which includes stanchions 15 and 17 and which also supports a load cell sensor 30, as described in more detail below. Assembly 12 includes a pair of levers 16 and 18 having brackets 20 and 22, respectively, at their inner ends, which establish lever load sections 21 and 23 in this construction, connected to a force transmission platform 32 of the load cell sensor 30 by force transmission links 24 and 26, respectively.

Mounted to the opposite ends of levers 16 and 18 are blade elements 40 and 42, respectively, which establish lever fulcrum sections 41 and 43 in this construction. Each blade element 40, 42 has a line-of-contact rounded bearing edge which contacts flexure plates 50 and 52 to establish fulcrums 80 and 82, respectively, as described in more detail below. An intermediate portion of levers 16, 18 are connected to load links 60 and 62, which establish lever connector sections 61 and 63 in this construction to suspend the weigh frame WF on which loads are placed.

In operation, total forces applied to force transmission platform 32 by tension load links 24 and 26 are summed by load cell sensor 30 and are transmitted by wire or by wireless communications to a microprocessor or other computing device, and then to memory storage and/or an output device with indicia perceptible by users. Signals from the two load cells are summed to obtain a signal proportional to the load on the weigh frame. In one construction, this is conventionally done with a load cell summing junction box with signal trimming, such as accomplished using a Totalcomp Model CSB-40. Force calculations can be made as known in the art using distance A, illustrated by arrow 70 extending from fulcrum 80 to tension load link 60, and distance B, illustrated by arrow 72 extending from fulcrum 80 to force transmission link 24 in this construction. The ratio of distance A to distance B typically ranges from 1:3 to 1:4 in currently preferred constructions. Also illustrated in FIG. 1 is a test weight TW which can be placed directly on the sensor 30 to calibrate the load sensing assembly 12.

Figure 2:
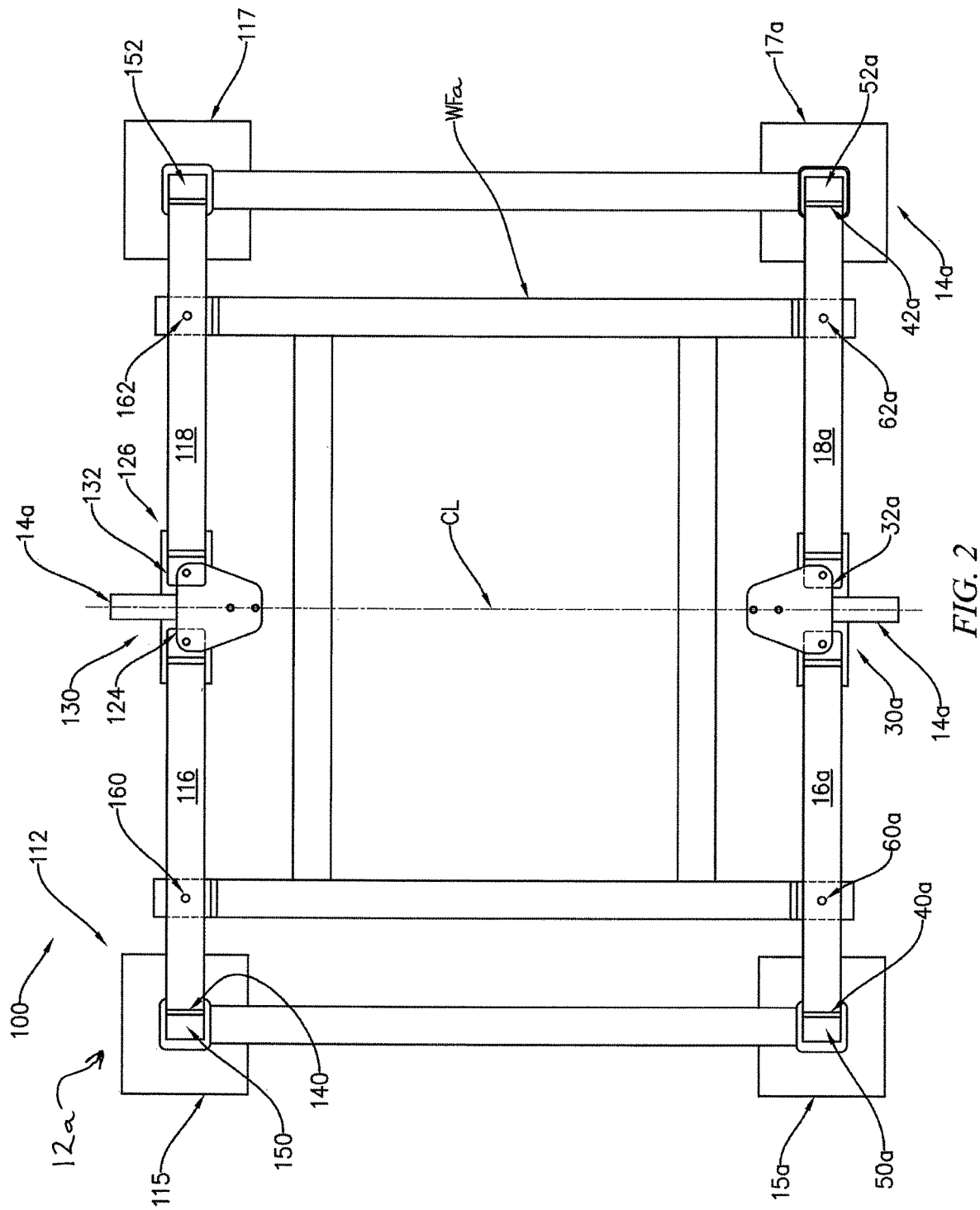
FIG. 2 is a schematic top view of a load sensing system similar to FIG. 1 with opposing load sensing assemblies connected to a rectangular weigh frame.

Load sensing system 100 according to the present invention, FIG. 2, has opposing load sensing assemblies 12a and 112 connected to a rectangular weigh frame WFa. In one construction, assembly 12a is similar to assembly 12, FIG. 1, and opposing assembly 112 is identical to assembly 12a and both occupy a shared horizontal plane of orientation.

In other constructions, assemblies 12a and 112 differ from each other by at least one component and/or by different lengths or other dimensions of at least one component, such as different lengths of force transmission links and/or load links. In another construction, for example assemblies 12a and 112 occupy a shared common, non-horizontal plane utilizing different length tension connectors (cables) on the two pairs of levers which while lying in a tilted plane could still accommodate a horizontal weigh platform. Other configurations of weigh frames can be utilized as well, such as round (circular), oval, or other geometric shape.

In one construction, assemblies 12a and 112 are supported by support frame 14a which includes stanchions 15a, 17a and 115, 117, respectively, and which also supports load cell sensors 30a and 130. Assembly 12a includes a pair of levers 16a and 18a connected at their inner ends to a force transmission platform 32a of the load cell sensor 30a by force transmission links 24a and 26a, respectively. Similarly, assembly 112 includes a pair of levers 116 and 118 connected at their inner ends to a force transmission platform 132 of the load cell sensor 130 by force transmission links 124 and 126, respectively. Sensors 30a and 130 are aligned along a common center line in this construction, as indicated by dashed line CL.

Mounted to the opposite ends of levers 16a and 18a of assembly 12a are blade elements 40a and 42a, respectively. Each blade element 40a, 42a has a line-of-contact rounded bearing edge which contacts flexure plates 50a and 52a, respectively. An intermediate portion of levers 16a, 18a are connected to load links 60a and 62a to suspend one side of the weigh frame WFa. Similarly, blade elements 140 and 142 are mounted to the opposite ends of levers 116 and 118, respectively, of assembly 112. Each blade element 140, 142 has a line-of-contact rounded bearing edge which contacts flexure plates 150 and 152, respectively. An intermediate portion of levers 116, 118 are connected to load links 160 and 162 to suspend the opposite side of the weigh frame WFa.

One construction of lever 16a, FIG. 2, is shown schematically in bottom and side views in FIGS. 3A-3B, respectively, having a blade element 40a attached to a first, outer end of lever 16a and a bracket 20a attached to its inner, opposite end. Blade element 40a has a line-of-contact rounded bearing edge 184 which contacts flexure plate 50a in middle portion 240, FIG. 5, to establish fulcrum 80, FIG. 2. A block or mount 190, FIGS. 3A-3B, is welded or otherwise secured to the bottom surface of lever 16a to anchor a first, inner end 250 of flexure plate 50a, FIG. 5, utilizing bolts or other fasteners passing through holes 252 and 254 in flexure plate 50a and mounted in holes 192 and 194, FIGS. 3A-3B, in this construction. Arrow 191 represents the distance of fasteners placed in holes 192, 194 to the fulcrum 80 established by the contact of bearing edge 184 with the flexure plate 50a.

Flexure plates utilized for stabilized fulcrums in systems according to the present invention only need to be long enough to easily deflect a minute amount (typically <0.002 in) and short enough to resist buckling under longitudinal compression. Each flexure plate should have an adequate hardness so as not to dent or deform under the compressive stress of the rounded fulcrum that bears against it. The choice of length is not critical but must fit within the allocable space provided by dimension A of the lever. In once construction for a 500-pound capacity scale, the length, width and thickness of is $3^{13}/_{32}$ inches×$1^{1}/_{2}$×0.032 inches of blue tempered steel hardened to Rockwell #C48/51.

An intermediate portion of lever 16a defines a hole or recess 202, FIGS. 3A-3B, for connection to load link 60a, FIG. 2, to suspend the weigh frame WFa on which loads are placed. Arrow 70a represents the distance A from bearing edge 184 to recess 202. Similarly, arrow 72a represents distance B from bearing edge 184 to hole 214 defined by lower extended portion 216 of load force transmission bracket 20a. Tension cable 24a, FIG. 2, is attached to the lower portion 216 via the hole 214. In alternative constructions, a vertical flexure plate is utilized instead of a tension cable to connect to force transmission platform 32a, FIG. 2.

Stanchion 15a, FIG. 2, is shown in greater detail in FIGS. 4A-4B having a block 220 which defines holes 222 and 224 to receive fasteners passing through holes 232 and 234, FIG. 5, to anchor an outer portion 230 of flexure plate 50a, FIG. 2 and FIG. 5, to the support frame 14a. In one construction, sensor 30a is a single point, parallel beam load cell as illustrated in FIGS. 6A and 6B with force transmission platform 32a.

One advantage provided by the present invention is that the levers, each secured by a stabilized fulcrum, cannot vibrate laterally in sympathy with the vibratory disturbances created by the rotating elements in a screw feeder (the metering screw and agitator if there is one) or by the vibratory action of a vibratory pan feeder, or especially from other nearby mechanical disturbances. Load sensing systems according to the present invention are suitable as scales for use with loss-in-weight feeders which have a scale supporting a volumetric feeder with attached hopper which automatically refills before running empty from a supply bin overhead. During the refill cycle, volumetric control is used (instead of gravimetric control) until the hopper is fully refilled and the scale has settled out from the disturbance created by refilling By keeping the levers anchored firmly against lateral movement, the "settling" time can be shortened which extends the percentage of gravimetric running time.

By maximizing the incremental change in the loading signal (delta voltage, delta amperage, delta frequency) per unit of time, a loss-in-weight feeder can operate over longer gravimetric cycles before a refill is required, and/or more effectively respond to a dynamic demand signal (setpoint), and/or operate over a larger turn-down ratio (maximum flow rate/minimum flow rate). Depending on performance requirements, however, a certain number of applications can be adequately served by a gross weighing scale, taking advantage of its simpler construction and lower cost.

The present invention is especially suitable for those applications that can be served without employing mass counterbalancing with up to five or more important benefits:

1. Stability in presence of vibratory disturbances from nearby processing machinery;
2. Availability of stainless-steel construction of all parts including the load cells;
3. Lower cost resulting from fewer distinct "building blocks", that is, with interchangeable components such as four identical levers and two identical load cells;
4. Reduction in the size of required static test weights, because such weights can be applied through mechanical leverage onto the load cell platform; and
5. Load cells can be replaced without removing loading items (e.g., a feeder, a hopper, and/or the material to be weighed) from the weigh platform.

Certain applications, and their measurement and control requirements, for weigh feeders such as a loss-in-weight feeder can be handled without employing a mass counterbalanced scale, most notably where the dead load (weight of supported volumetric feeder and its supply hopper) does not consume too much of the loading range of the scale. However, a mass counterbalanced scale will provide higher signal levels which inarguably are beneficial to the concurrent tasks of measurement and control.

Figure 7:
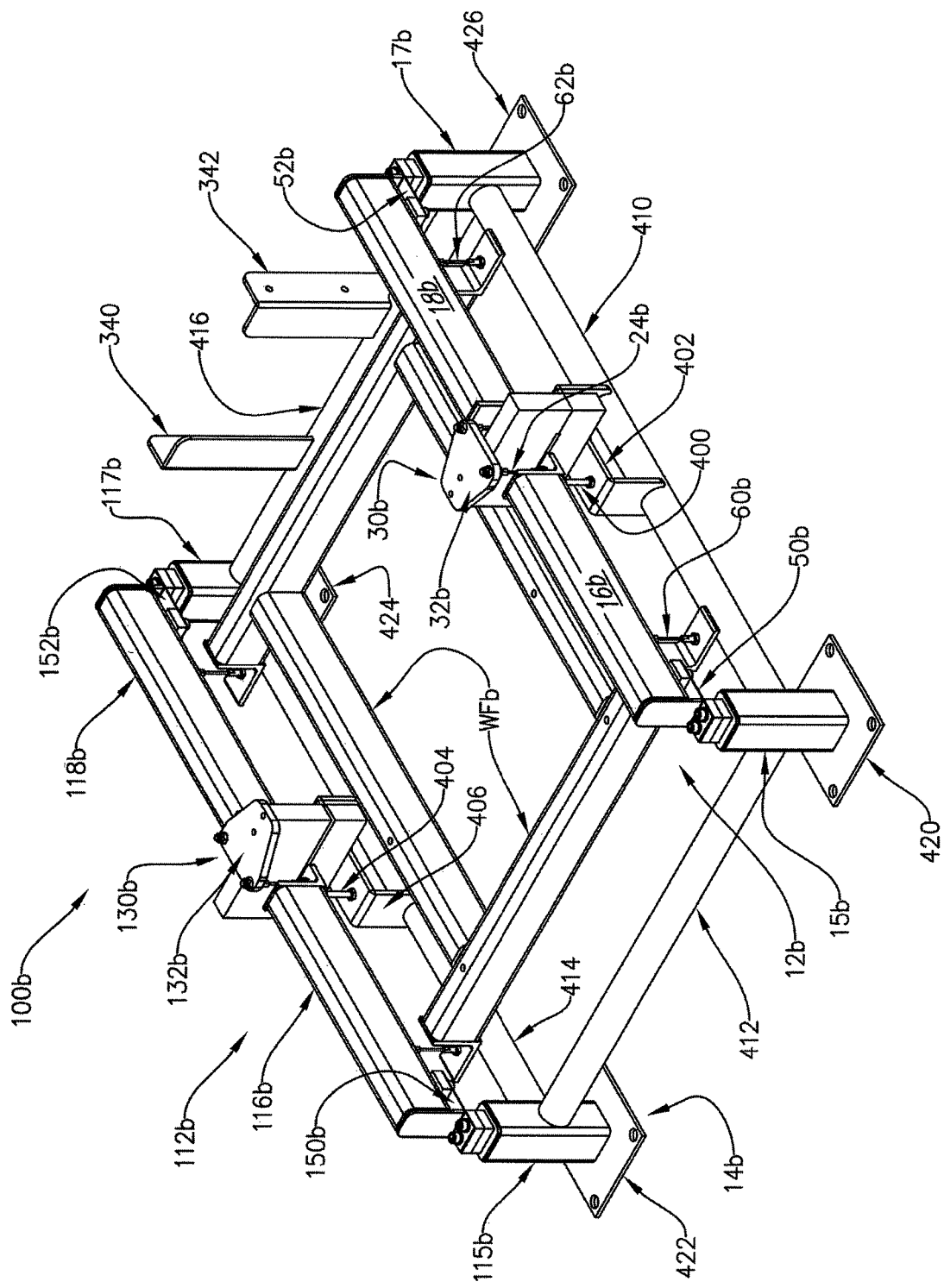
FIG. 7 is a schematic perspective view of another load sensing system similar to that of FIG. 2 mounted on a rectangular base frame with a suspended weigh frame.
Figure 7A:
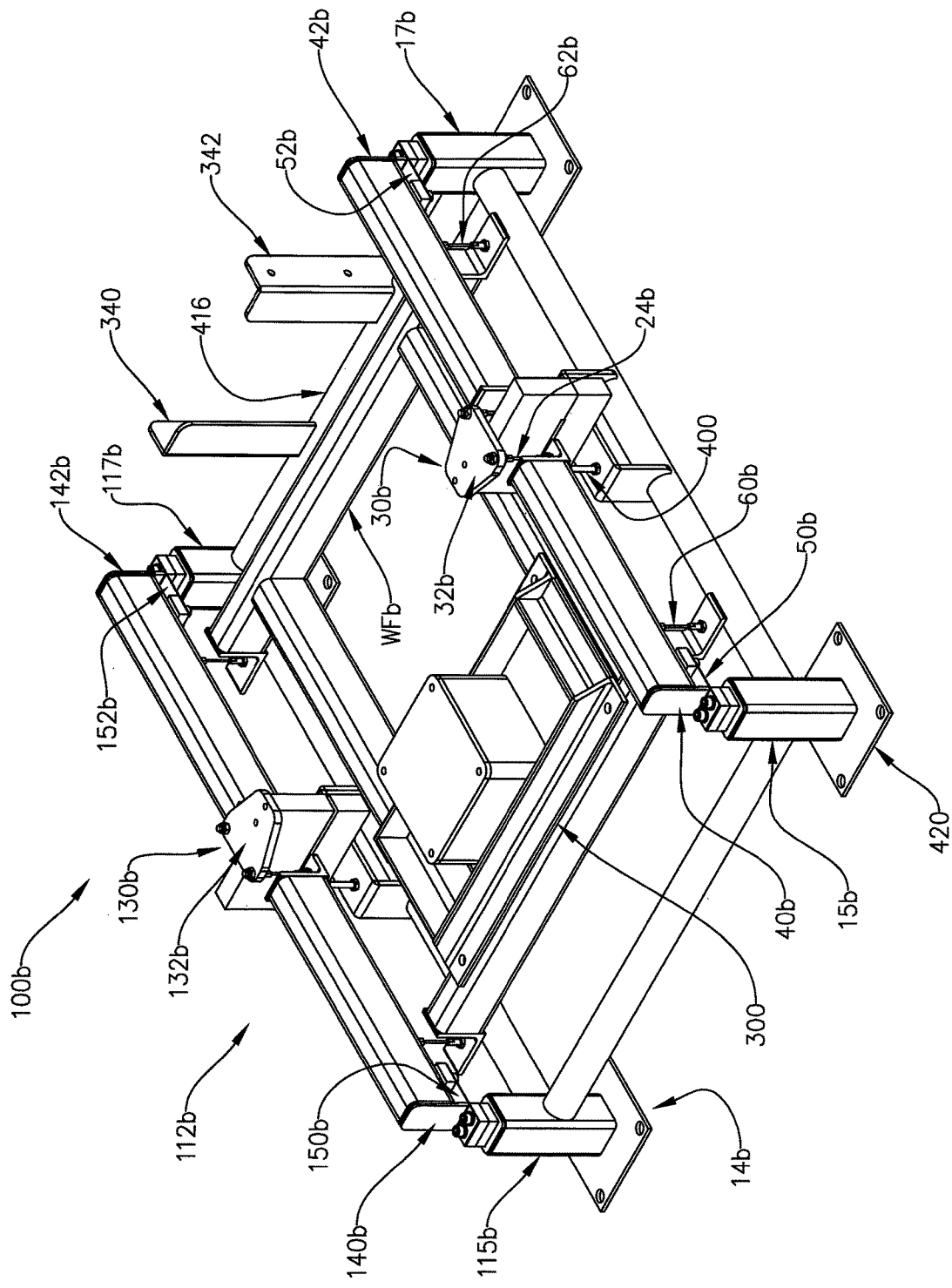
FIG. 7A is a schematic perspective view of the system of FIG. 7 with a volumetric feeder attachment frame bolted to the weigh frame.
Figure 8:
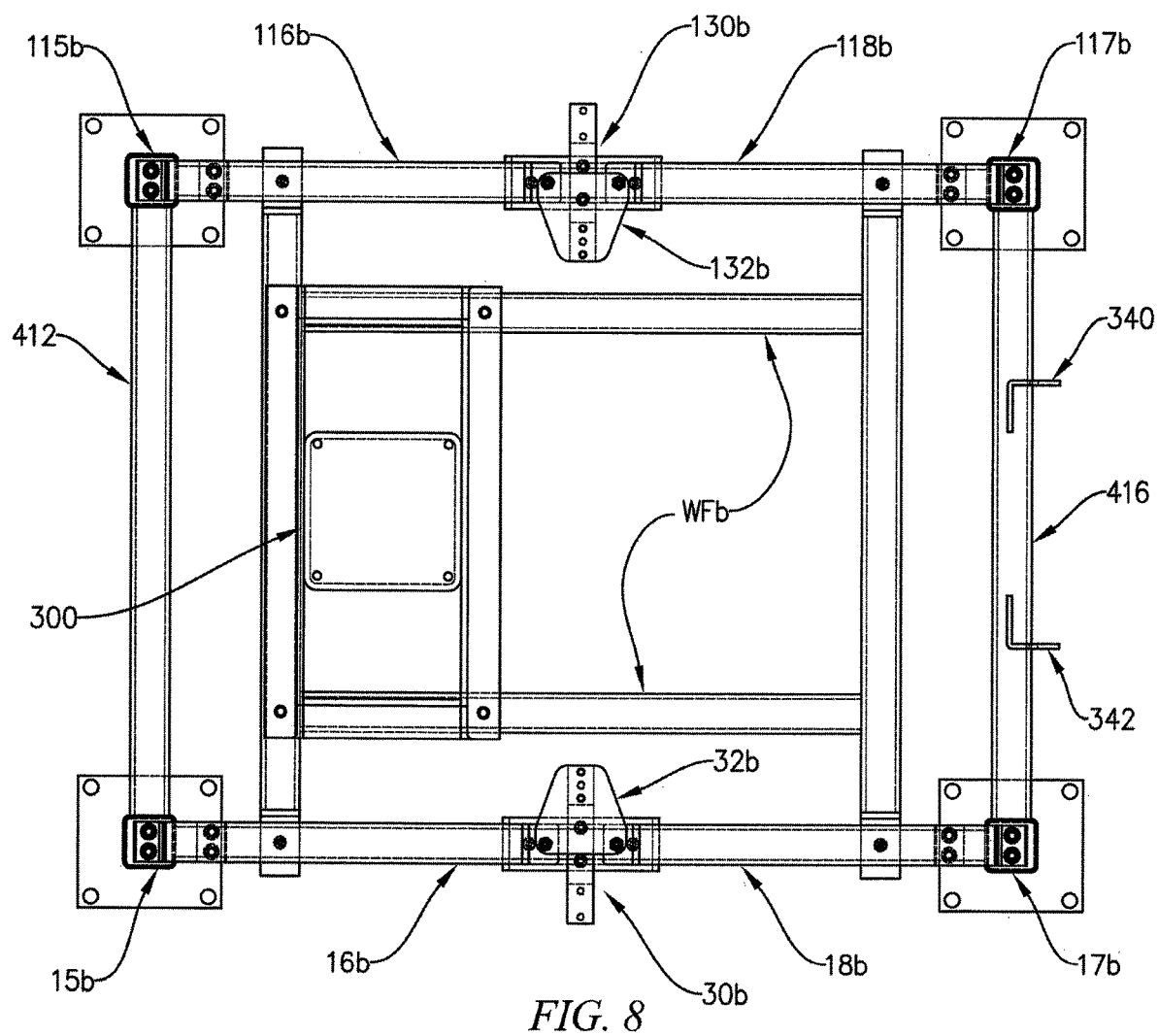
FIG. 8 is a schematic top view of the system of FIG. 7A.

Load sensing system 100b according to the present invention, FIGS. 7 and 7A, has opposing load sensing assemblies 12b and 112b suspending a rectangular weigh frame WFb. In one construction illustrated in FIGS. 7A-10, a volumetric feeder attachment frame 300 is bolted to the weigh frame WFb. In some constructions, assembly 12b is similar to assembly 12, FIG. 1, opposing assembly 112b is identical to assembly 12b, and both assemblies 12b and 112b occupy a shared horizontal plane of orientation.

As illustrated in FIGS. 7-10, assemblies 12b and 112b are supported by support frame 14b which includes stanchions 15b, 17b and 115b, 117b, respectively, and which also supports load cell sensors 30b and 130b. Assembly 12b includes a pair of levers 16b and 18b connected at their inner ends to a force transmission platform 32b of the load cell sensor 30b by force transmission links 24b and 26b, respectively. Similarly, assembly 112b includes a pair of levers 116b and 118b connected at their inner ends to a force transmission platform 132b of the load cell sensor 130b by force transmission links 124b and 126b, respectively.

Figure 9:
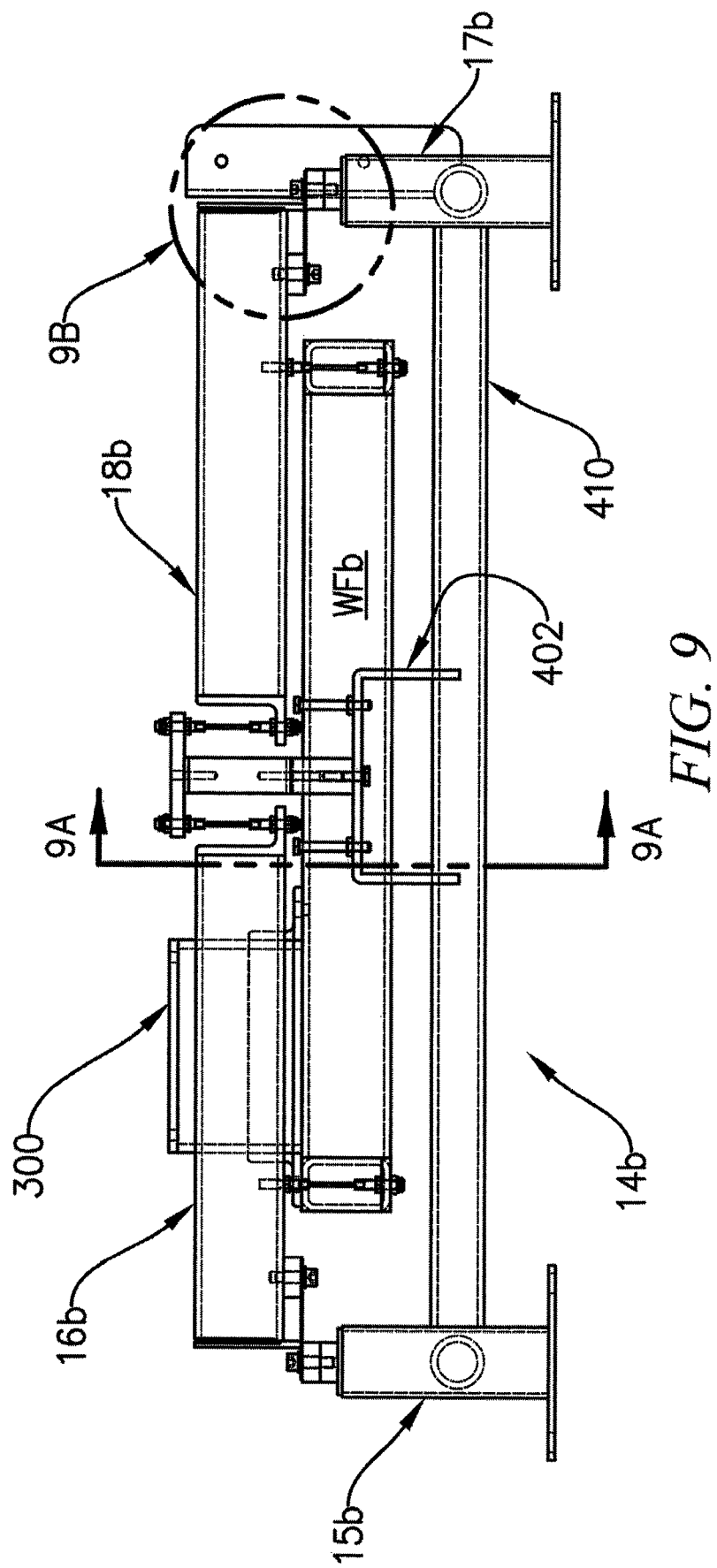
FIG. 9 is a schematic side view of the system of FIG. 7A.
Figure 9A:
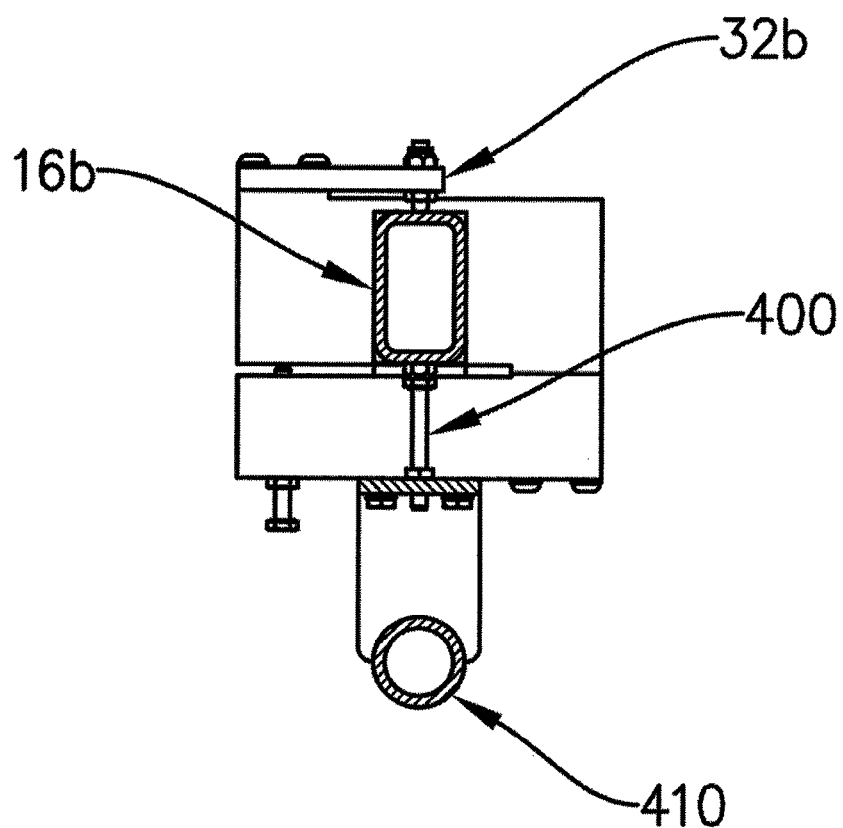
FIG. 9A is a partial cross-sectional view along lines 9A-9A of FIG. 9.
Figure 9B:
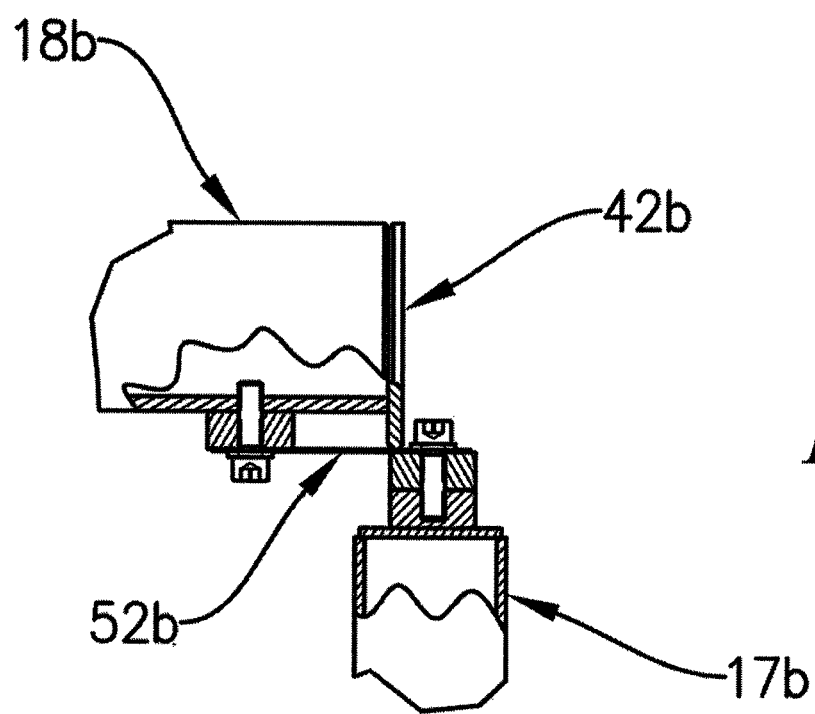
FIG. 9B is an enlarged view of a portion of FIG. 9.
Figure 10:
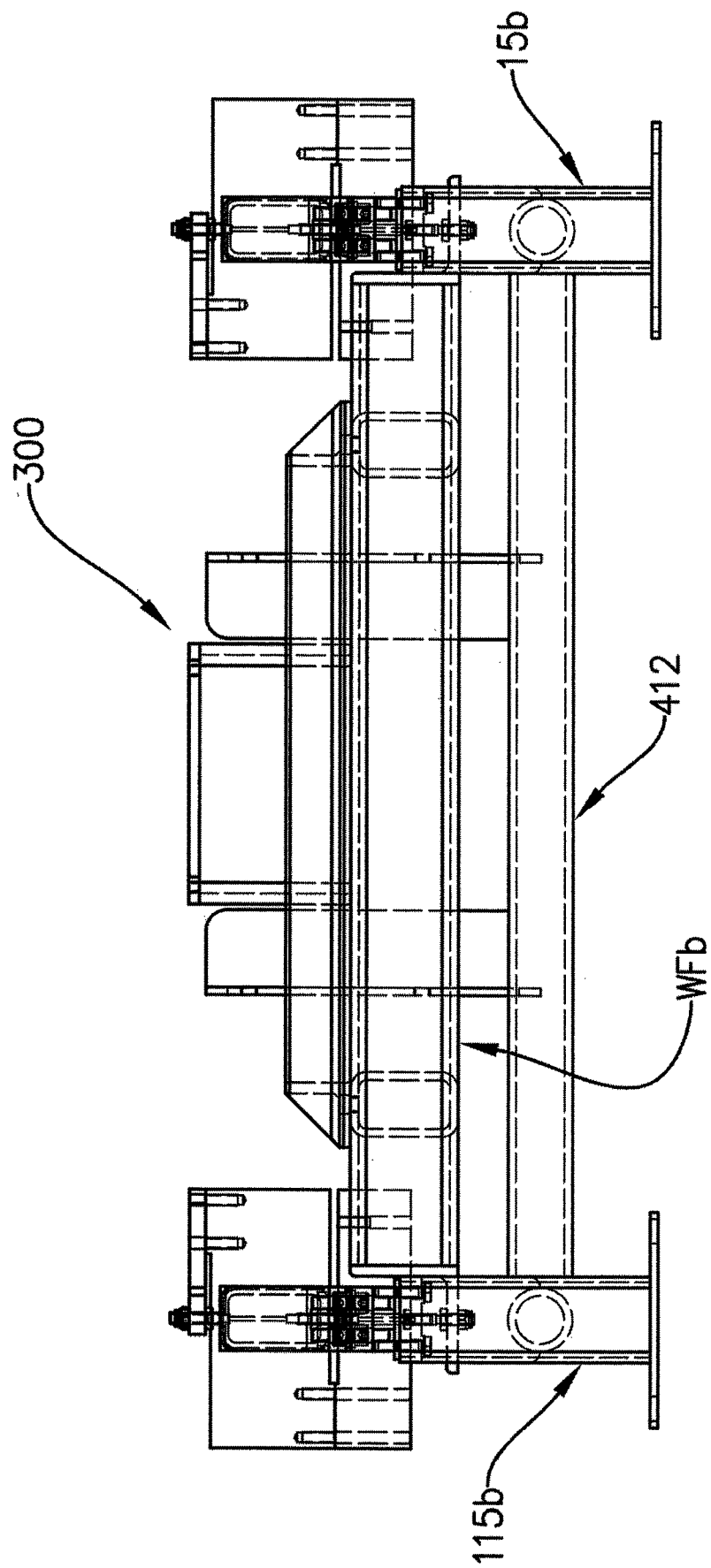
FIG. 10 is a schematic end view of the system of FIG. 7A.

Blade elements 40b and 42b are mounted to the opposite ends of levers 16b and 18b of assembly 12b, respectively. Each blade element 40b, 42b has a line-of-contact rounded bearing edge which contacts flexure plates 50b and 52b, respectively. An intermediate portion of levers 16b, 18b are connected to load links 60b and 62b to suspend one side of the weigh frame WFa. Similarly, blade elements 140b and 142b are mounted to the opposite ends of levers 116b and 118b, respectively, of assembly 112b. Each blade element 140b, 142b also has a line-of-contact rounded bearing edge which contacts flexure plates 150b and 152b, respectively. An intermediate portion of levers 116b, 118b are connected to load links 160b and 162b to suspend the opposite side of the weigh frame WFb. As illustrated in FIG. 9A, lever 16b is hollow in one construction.

Angle brackets 340 and 342, FIGS. 7-7A, are optional and are secured to support frame 14b to mount additional components such as a summing junction box, or other instrumentation as desired. Volumetric feeder 300 is conventional. In one construction, a stainless steel material is utilized for at least some of the components of system 100b to facilitate periodic washing with water or other cleaning.

Adjustable stops such as stops 400 and 404 are utilized in some constructions to lock the levers in a selected orientation to prevent force from being applied to the force transmission platform 32b and/or the platform 132b when system 100b is not actively weighing loads. In other words, optional stops 400 and 404 can be adjusted to limit downward motion of the levers so as to protect the load cell from overloads and they can also be used as elevating jacks to relieve all loading from the load cells so they can be replaced without removing the loading on the weigh frame. As labeled in FIG. 7, stop 400 is supported by bracket 402 on tubular support member 410 and selectively limits downward motion of lever 16b; bracket 402 also provides support for sensor 30b. Similarly, stop 404 is supported by bracket 406 on tubular support member 414 and selectively limits downward motion of lever 116b; bracket 406 also provides support for sensor 130b. Tubular support members 410, 412, 414 and 416 rigidly maintain fixed spacing among pairs of stanchions 15b-17b, 15b-115b, 115b-117b and 117b-17b, respectively. Additional base support is provided in this construction by base plates 420, 422, 424 and 426 which can be bolted to a floor or other base.

Figure 11:
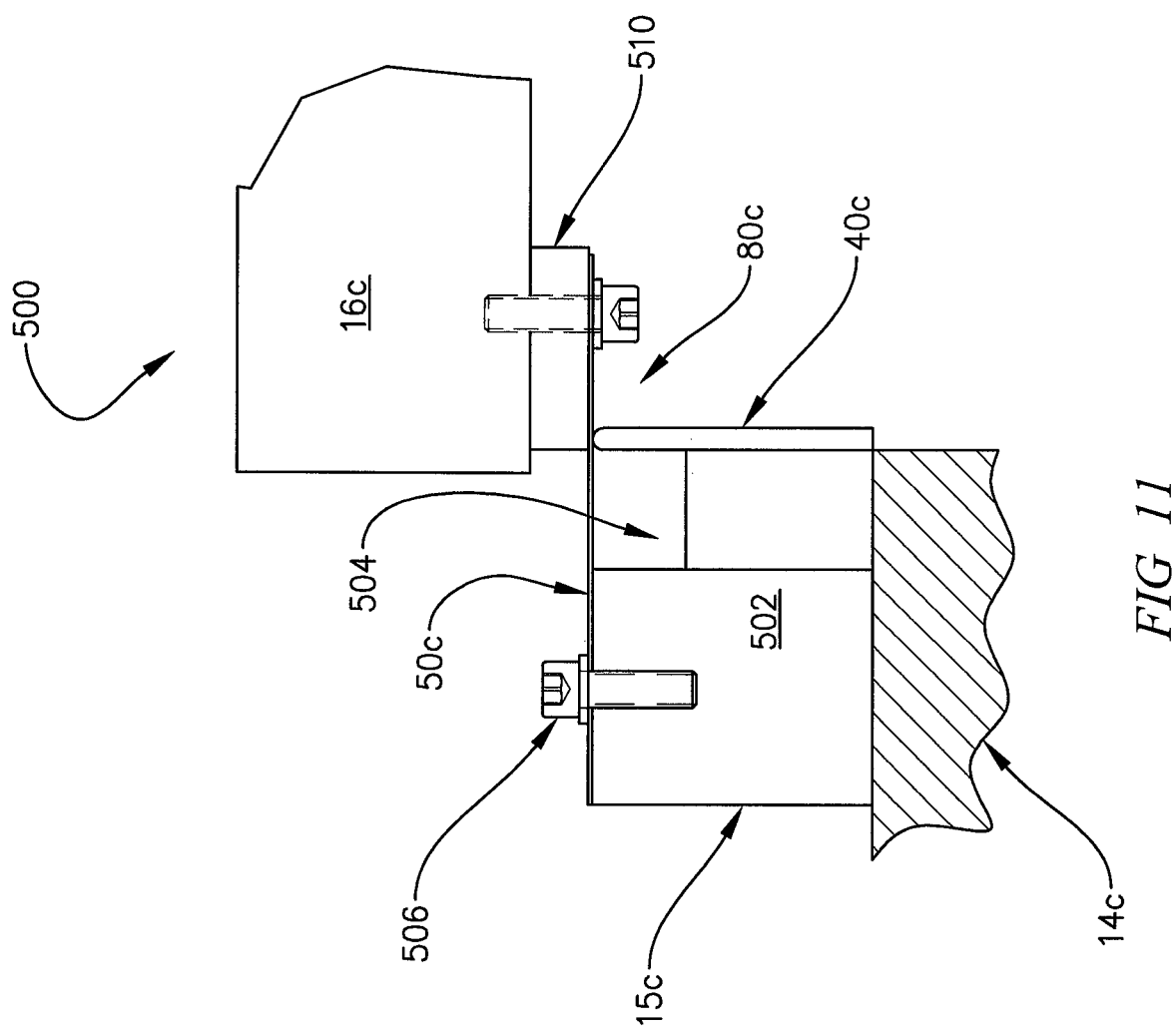
FIG. 11 is a schematic side view of an alternative embodiment according to the present invention.

Although each rounded bearing edge has been described in the above constructions as belonging to a blade element extending from each lever, that is not a limitation of the invention. One alternative construction is illustrated for a portion of load sensing assembly 500, FIG. 11, having a blade element 40c extending upward and attached to a strut or block 502 which is secured to a stanchion 15c and a support frame 14c. A horizontal flexure plate 50c is secured at its outer end to stanchion 15c by a fastener 506. An inner end portion of flexure plate 50c is attached to a block 510 by a fastener 508. The block 510 is connected to lever 16c and has a flat bearing face abutting the upper surface of the middle portion of flexure plate 50c. A space 504 is established in this construction between flexure plate 50c and block 502 such that the lower surface of the middle portion of flexure plate 50c is contacted only by the rounded bearing edge of blade element 40c to create a fulcrum 80c against the flexure plate 50c and the bearing face of block 510.

In yet other constructions, the fulcrum is placed between the lever load section and the connector section, in which case the connector section would pull upward rather than downward on the load cell platform. In such an arrangement, the test weights would stay on the platforms and provide mass counterbalancing of a portion of the dead loads. The test weights would be lifted off the platform instead of being placed on them. In either case, the lever ratios provide the same mechanical advantage in sizing the test weights.

For load sensing systems according to the present invention, it is preferred to have a combination of a single point parallelogram load cell and force connectors to it that are flexible side-to-side, preferably universally flexible, and stiff along their length. The present invention eliminates external moments from being applied to a single point load cell so that its internal compensation is not adversely affected. The system disclosed in U.S. Pat. No. 9,024,212 by Hyer et al. eliminate the external moments by using flexure plates as the tension link to the load cell for conveyor-type scales. The currently preferred components for the present invention eliminate the external moments by using wire rope cables as the lever connector link.

One key benefit for systems according to the present invention utilizing a single point load cell is that two or more tension inputs can be readily summed by attaching the universally flexible/yieldable connector links to separate locations on the load cell platform. The beauty of the single point load cell, is that it can receive multiple vertical non-axial loads anywhere on a platform PROVIDING the platform is not subjected to outside forces or moments (other than those due to the off-center loads). The flexure plates used in the present application act as a drag link in that they resist or "anchor" the lever from lateral movement. The tension or compression in them is not affected by the load being sensed nor does the load being sensed affect the tension or compression in them. Forces proportional to loads being sensed are transmitted directly through flexure plates in systems disclosed in U.S. Pat. No. 2,741,472 by Thayer et al., U.S. Pat. No. 3,658,143 by Schwartz and U.S. Pat. No. 9,024,212 by Hyer et al., except for particular flexure plates disclosed in U.S. Pat. Nos. 2,741,472 and 3,658,143 acting as lever fulcrums.

In some constructions according to the present invention for certain force ranges, the load cell utilized is similar to load cell 18 of U.S. Pat. No. 9,024,212 by Hyer et al. and is a single point load cell such as Model 1130 available from Vishay Tedea-Huntleigh. In U.S. Pat. No. 9,024,212, the load cell 18 is mounted so that the free ends of the cantilevered beams, relative to support surface 148, extend in the direction of conveyor belt travel as best illustrated in FIG. 1 of U.S. Pat. No. 9,024,212. However, the single point load cell currently preferred for use according to the present invention with a loss-in-weight feeder is a Sensortronics 60051 single point load cell.

Although specific features of the present invention are shown in some drawings and not in others, this is for convenience only, as each feature may be combined with any or all of the other features in accordance with the invention. While there have been shown, described, and pointed out fundamental novel features of the invention as applied to one or more preferred embodiments thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A load sensing system comprising at least one load sensing assembly for use with a weigh frame, each assembly including:
    at least a first lever and a second lever, each lever having a lever longitudinal axis, a lever fulcrum section, a lever load section, and a lever connector section spaced from the lever fulcrum section and the lever load section along the lever longitudinal axis;
    for each lever, a flexure plate aligned in parallel with the lever longitudinal axis, the flexure plate having a middle bearing portion and opposing end portions with one of the end portions fixedly attached to its respective lever;
    each lever fulcrum section has a lever bearing surface including one of (i) a line-of-contact rounded bearing edge oriented perpendicular to the lever longitudinal axis or (ii) a flat bearing face, the lever bearing surface of each lever touching the middle bearing portion of the flexure plate;
    a sensor having a support surface, a force transmission platform, and an output representative of total force applied to the force transmission platform;
    at least one force transmission link adapted to connect each lever connector section to the force transmission platform; and
    at least one load link adapted to connect the lever load section of each lever to the weigh frame.

2. The system of claim 1 wherein each force transmission link for each lever connector section includes a relatively inextensible and transversely yieldable tension connector attachable to the force transmission platform.

3. The system of claim 1 wherein each load link for each lever load section includes a relatively inextensible and transversely yieldable tension connector attachable to the weigh frame.

4. The system of claim 1 wherein each lever load section is disposed between the lever fulcrum section and the lever connector section.

5. The system of claim 1 wherein the sensor includes a single point, multiple parallel beam load cell.

6. The system of claim 1 further including, for each lever fulcrum section of each lever, a support defining a support bearing surface having the other of (i) a line-of-contact rounded bearing edge oriented perpendicular to the lever longitudinal axis or (ii) a flat bearing face, the support bearing surface for each lever touching an opposite side of the middle bearing portion of the flexure plate, and the other of the end portions of the flexure plate for that lever fixedly attached to another portion of the support to enhance lateral stability for that lever.

7. The system of claim 1 wherein the first lever and the second lever are identical to each other.

8. A load sensing system for a platform scale having a weigh frame, the load sensing system comprising at least two load sensing assemblies, each assembly including:
    at least a first lever and a second lever, each lever having a lever fulcrum section, a lever load section and a lever connector section spaced from the lever fulcrum section and the lever load section;
    for each lever, a flexure plate aligned in parallel with the lever longitudinal axis, the flexure plate having a middle bearing portion and opposing end portions with one of the end portions fixedly attached to its respective lever to provide lateral stability for that lever;
    a load cell having a support surface, a force transmission platform, and an output representative of total force applied to the force transmission platform;
    at least one force transmission link connecting each lever connector section to the force transmission platform; and
    at least one load link connecting the lever load section of each lever to the weigh frame;
    wherein the load sensing assemblies are positioned on opposing sides of the weigh frame.

9. The system of claim 8 wherein the load sensing assemblies are positioned parallel to each other.

10. The system of claim 8 wherein each force transmission link for each lever connector section includes a relatively inextensible and universally flexible tension connector attachable to the force transmission platform for its respective load cell.

11. The system of claim 8 wherein each load link for each lever load section includes a relatively inextensible and universally flexible tension connector attachable to the weigh frame.

12. The system of claim 8 wherein each lever load section is disposed between the lever fulcrum section and the lever connector section.

13. The system of claim 8 wherein the first lever and the second lever of each assembly are identical to each other.

14. The system of claim 8 wherein each lever fulcrum section has a lever bearing surface including a line-of-contact rounded bearing edge oriented perpendicular to the lever longitudinal axis, the lever bearing surface of each lever touching the middle bearing portion of the flexure plate.

15. A method for measuring loads on a weigh frame utilizing a load sensing system, the method comprising:
    selecting a load sensing system having at least two load sensing assemblies, each assembly including:
        (A) at least a first lever and a second lever, each lever having a lever fulcrum section, a lever load section and a lever connector section spaced from the lever fulcrum section and the lever load section;
        (B) for each lever, a flexure plate aligned in parallel with the lever longitudinal axis, the flexure plate having a middle bearing portion and opposing end portions with one of the end portions fixedly attached to its respective lever to provide lateral stability for that lever;

(C) a load cell having a support surface, a force transmission platform, and an output representative of total force applied to the force transmission platform;

(D) at least one force transmission link connecting each lever connector section to the force transmission platform; and (E) at least one load link connecting the lever load section of each lever to the weigh frame, wherein the load sensing assemblies are positioned on opposing sides of the weigh frame;

applying loads onto the weigh frame; and measuring total force applied to each load cell.

16. The method of claim 15 including selecting each lever fulcrum section to include a lever bearing surface including a line-of-contact rounded bearing edge oriented perpendicular to the lever longitudinal axis, the lever bearing surface of each lever touching the middle bearing portion of the flexure plate.

17. The method of claim 15 wherein a volumetric feeder with a hopper is attached to the weigh frame and applying loads includes automatically refilling the hopper before the hopper becomes empty.

18. The method of claim 15 wherein measuring includes summing signals from the at least two load cells to obtain a signal proportional to the load on the weigh frame.

19. The method of claim 15 wherein each force transmission link for each lever connector section is selected to include a relatively inextensible and transversely yieldable tension connector attachable to the force transmission platform and each load link for each lever load section is selected to include a relatively inextensible and transversely yieldable tension connector attachable to the weigh frame.

* * * * *